(12) United States Patent
Gebhard et al.

(10) Patent No.: US 10,346,478 B2
(45) Date of Patent: Jul. 9, 2019

(54) EXTENSIBLE SEARCH TERM SUGGESTION ENGINE

(71) Applicant: Microsoft Technology Licensing, LLC, Redmond, WA (US)

(72) Inventors: Derek S. Gebhard, Seattle, WA (US); Marc Wautier, Seattle, WA (US); Manav Mishra, Kirkland, WA (US); Edward Boyle Averett, Kirkland, WA (US); Brendan D. Elliott, Redmond, WA (US); David J. G. Wood, Seattle, WA (US); Philip P. Fortier, Seattle, WA (US); Andrei T. Aron, Kirkland, WA (US); Vivekanandan Elangovan, Bellevue, WA (US); Kwong K. Leung, Redmond, WA (US); Arun Gurunathan, Bellevue, WA (US); Octavio Alfredo Cruz Sanchez, Seattle, WA (US); Priya Vaidyanathan, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/942,050

(22) Filed: Jul. 15, 2013

(65) Prior Publication Data

US 2013/0304757 A1 Nov. 14, 2013

Related U.S. Application Data

(63) Continuation of application No. 12/947,170, filed on Nov. 16, 2010, now Pat. No. 8,515,984.

(51) Int. Cl.
*G06F 16/90* (2019.01)
*G06F 16/9032* (2019.01)
*G06F 16/332* (2019.01)

(52) U.S. Cl.
CPC .... *G06F 16/90324* (2019.01); *G06F 16/3322* (2019.01); *G06F 16/90332* (2019.01)

(58) Field of Classification Search
CPC .......... G06F 17/3097; G06F 16/90324; G06F 16/3322
(Continued)

(56) References Cited

U.S. PATENT DOCUMENTS

| 6,418,429 B1 | 7/2002 | Borovoy et al. |
| 6,708,162 B1 | 3/2004 | Morgan et al. |

(Continued)

FOREIGN PATENT DOCUMENTS

| CA | 2763668 A1 | 12/2010 |
| CN | 1716255 | 1/2006 |

(Continued)

OTHER PUBLICATIONS

"Foreign Office Action", CN Application No. 201110362974.0, dated Jan. 24, 2014, 12 Pages.

(Continued)

*Primary Examiner* — Jeff A Burke
*Assistant Examiner* — Cindy Nguyen
(74) *Attorney, Agent, or Firm* — Newport IP, LLC; Benjamin Keim

(57) ABSTRACT

A search term suggestion engine of a computing device receives characters of user data as the characters are input. The user data is at least part of a search term to be provided to one of multiple applications to search for the search term. An indication of multiple suggestion sources is received from the one application, and one or more suggested search terms are obtained, from the multiple suggestion sources, based on the received characters. One or more suggested search terms can also be obtained from the multiple suggestion sources based on one or more linguistic alternatives (Continued)

for the received characters. The one or more suggested search terms are combined into a combined set of suggested search terms, and the combined set of suggested search terms is returned to a search user interface for presentation to the user.

20 Claims, 6 Drawing Sheets

(58) Field of Classification Search
USPC .......................................................... 707/767
See application file for complete search history.

(56) References Cited

U.S. PATENT DOCUMENTS

| | | | |
|---|---|---|---|
| 6,847,959 | B1 | 1/2005 | Arrouye et al. |
| 7,272,601 | B1 | 9/2007 | Wang et al. |
| 7,379,965 | B2 | 5/2008 | Sherwood et al. |
| 7,451,136 | B2 | 11/2008 | Chua et al. |
| 7,461,059 | B2 | 12/2008 | Richardson et al. |
| 7,499,940 | B1 | 3/2009 | Gibbs |
| 7,552,400 | B1 | 6/2009 | Sriver et al. |
| 7,725,485 | B1* | 5/2010 | Sahami ............... G06F 17/3069 707/766 |
| 7,840,579 | B2 | 11/2010 | Samuelson et al. |
| 7,890,526 | B1 | 2/2011 | Brewer et al. |
| 7,890,886 | B2 | 2/2011 | Matthews et al. |
| 7,958,143 | B1 | 6/2011 | Amacker |
| 8,060,487 | B2 | 11/2011 | Schmidt-Karaca et al. |
| 8,176,068 | B2 | 5/2012 | Kunjithapatham et al. |
| 8,204,897 | B1* | 6/2012 | Djabarov ............ G06F 17/30705 707/767 |
| 8,332,748 | B1 | 12/2012 | Karam |
| 8,515,984 | B2 | 8/2013 | Gebhard et al. |
| 8,694,483 | B2* | 4/2014 | Roulland ........... G06F 17/30646 707/706 |
| 8,825,694 | B2 | 9/2014 | Samuelson et al. |
| 9,037,565 | B2 | 5/2015 | Vaidyanathan et al. |
| 2002/0109725 | A1 | 8/2002 | Suzuki et al. |
| 2005/0065922 | A1 | 3/2005 | Miller et al. |
| 2005/0102280 | A1 | 5/2005 | Tanaka et al. |
| 2005/0149496 | A1 | 7/2005 | Mukherjee et al. |
| 2005/0154723 | A1 | 7/2005 | Liang |
| 2005/0234879 | A1 | 10/2005 | Zeng et al. |
| 2005/0278321 | A1 | 12/2005 | Vailaya et al. |
| 2006/0053065 | A1 | 3/2006 | Bowman |
| 2006/0112179 | A1 | 5/2006 | Baumeister et al. |
| 2006/0136378 | A1 | 6/2006 | Martin |
| 2006/0136389 | A1 | 6/2006 | Cover et al. |
| 2006/0190436 | A1* | 8/2006 | Richardson ......... G06F 17/3064 |
| 2006/0200827 | A1 | 9/2006 | Sidlosky et al. |
| 2006/0248050 | A1 | 11/2006 | Brooks et al. |
| 2006/0256088 | A1* | 11/2006 | Kong ........................... 345/168 |
| 2007/0038602 | A1 | 2/2007 | Weyand et al. |
| 2007/0061308 | A1 | 3/2007 | Hartwell et al. |
| 2007/0067292 | A1 | 3/2007 | Trowbridge et al. |
| 2007/0100890 | A1* | 5/2007 | Kim ........................... 707/104.1 |
| 2007/0118499 | A1 | 5/2007 | Hwang et al. |
| 2007/0143251 | A1 | 6/2007 | Brooks et al. |
| 2007/0156747 | A1 | 7/2007 | Samuelson et al. |
| 2007/0174244 | A1 | 7/2007 | Jones |
| 2007/0174286 | A1 | 7/2007 | Seitz et al. |
| 2007/0239671 | A1* | 10/2007 | Whitman ........... G06F 17/30448 |
| 2007/0265831 | A1 | 11/2007 | Dinur et al. |
| 2008/0033954 | A1 | 2/2008 | Brooks et al. |
| 2008/0077571 | A1* | 3/2008 | Harris ............... G06F 17/30864 |
| 2008/0208834 | A1 | 8/2008 | Boyer et al. |
| 2008/0222569 | A1 | 9/2008 | Champion |
| 2008/0306933 | A1 | 12/2008 | Valliani et al. |
| 2009/0006357 | A1 | 1/2009 | Popescul et al. |
| 2009/0019002 | A1 | 1/2009 | Boulis |
| 2009/0024613 | A1* | 1/2009 | Niu ................... G06F 17/30672 |
| 2009/0043741 | A1 | 2/2009 | Kim |
| 2009/0055388 | A1 | 2/2009 | Song et al. |
| 2009/0063448 | A1 | 3/2009 | DePue et al. |
| 2009/0077037 | A1 | 3/2009 | Wu et al. |
| 2009/0089260 | A1 | 4/2009 | Chong et al. |
| 2009/0094221 | A1* | 4/2009 | Cameron et al. ................. 707/5 |
| 2009/0112848 | A1* | 4/2009 | Kunjithapatham et al. ...... 707/5 |
| 2009/0187515 | A1 | 7/2009 | Andrew et al. |
| 2009/0210404 | A1* | 8/2009 | Wilson ............. G06F 17/30637 |
| 2009/0234722 | A1* | 9/2009 | Evevsky ................ G06Q 30/02 705/14.1 |
| 2009/0234808 | A1* | 9/2009 | Zarzar ............... G06F 17/30864 |
| 2009/0248666 | A1* | 10/2009 | Ahluwalia .......... G06F 17/3064 |
| 2009/0292538 | A1* | 11/2009 | Barnish .................. G10L 15/05 704/232 |
| 2010/0005443 | A1 | 1/2010 | Kwok et al. |
| 2010/0057702 | A1 | 3/2010 | Ghosh et al. |
| 2010/0082649 | A1 | 4/2010 | Gutt et al. |
| 2010/0100839 | A1 | 4/2010 | Tseng et al. |
| 2010/0138445 | A1 | 6/2010 | Luoma et al. |
| 2010/0161594 | A1 | 6/2010 | Prasad et al. |
| 2010/0185644 | A1 | 7/2010 | Gutt et al. |
| 2010/0231533 | A1 | 9/2010 | Chaudhri |
| 2010/0268661 | A1* | 10/2010 | Levy ..................... G06Q 30/02 705/347 |
| 2010/0306191 | A1 | 12/2010 | Lebeau et al. |
| 2010/0306215 | A1 | 12/2010 | Azar et al. |
| 2011/0191364 | A1* | 8/2011 | LeBeau et al. ............... 707/767 |
| 2011/0258584 | A1 | 10/2011 | Williams et al. |
| 2011/0314004 | A1 | 12/2011 | Mehta |
| 2011/0320481 | A1* | 12/2011 | Huang .......................... 707/769 |
| 2012/0030226 | A1 | 2/2012 | Holt et al. |
| 2012/0124035 | A1 | 5/2012 | Vaidyanathan |
| 2012/0124071 | A1 | 5/2012 | Gebhard |
| 2012/0124072 | A1 | 5/2012 | Vaidyanathan |
| 2012/0124519 | A1 | 5/2012 | Uphoff |
| 2012/0130814 | A1 | 5/2012 | Hayes |
| 2013/0198220 | A1 | 8/2013 | Vaidyanathan et al. |
| 2013/0212099 | A1 | 8/2013 | Dellinger et al. |
| 2017/0220680 | A1 | 8/2017 | Shattuck |

FOREIGN PATENT DOCUMENTS

| | | |
|---|---|---|
| CN | 101261565 | 9/2008 |
| CN | 101268463 | 9/2008 |
| CN | 101395604 | 3/2009 |
| CN | 101467147 | 6/2009 |
| CN | 101539836 | 9/2009 |
| CN | 101673176 | 3/2010 |
| CN | 101782833 | 7/2010 |
| CN | 101984395 | 3/2011 |
| CN | 102426607 | 4/2012 |
| JP | 01152527 | 6/1989 |
| JP | 6251064 A | 9/1994 |
| JP | 2001331486 | 11/2001 |
| JP | 2003523568 | 8/2003 |
| JP | 2005258524 | 9/2005 |
| JP | 2005327221 | 11/2005 |
| JP | 2006107113 | 4/2006 |
| JP | 2007200243 | 8/2007 |
| JP | 2009037501 | 2/2009 |
| JP | 2009530708 | 8/2009 |
| JP | 2010092383 | 4/2010 |
| JP | 2010212841 | 9/2010 |
| JP | 2011170813 | 9/2011 |
| KR | 20050026142 A | 3/2005 |
| KR | 20050082459 | 8/2005 |
| KR | 100621194 | 8/2006 |
| KR | 20070034313 | 3/2007 |
| KR | 20070111275 | 11/2007 |
| KR | 20090002226 A | 1/2009 |
| KR | 20100053269 | 5/2010 |
| RU | 2008114390 | 10/2009 |
| RU | 2009145272 | 6/2011 |
| TW | 200809549 | 2/2008 |
| TW | 200813755 | 5/2008 |
| TW | 200923690 | 6/2009 |

(56) References Cited

FOREIGN PATENT DOCUMENTS

| WO | WO-0153936 | 7/2001 |
|---|---|---|
| WO | 2009137292 A2 | 11/2009 |

OTHER PUBLICATIONS

"Foreign Office Action", CN Application No. 201110362987.0, dated Dec. 4, 2014, 7 Pages.
"Non-Final Office Action", U.S. Appl. No. 12/947,486, (dated Sep. 13, 2013), 16 pages.
"Foreign Office Action", CN Application No. 201110363012.7, dated Sep. 23, 2013, 10 Pages.
"Non-Final Office Action" U.S. Appl. No. 13/229,496, dated Jan. 14, 2014, 16 pages.
"Final Office Action", U.S. Appl. No. 13/801,637, dated Jan. 3, 2014, 26 pages.
"Corrected Notice of Allowance", U.S. Appl. No. 12/947,170, (dated Jul. 26, 2013),5 pages.
"Exploring Windows 7's New Search Features (Part 1)", retrieved from <http://www.windowsnetworking.com/articles_tutorials/Exploring-Windows-7s-New-Search-Features-Part1.html> on Aug. 31, 2011, (Sep. 15, 2009), 12 pages.
"Final Office Action", U.S. Appl. No. 12/947,292, (dated Dec. 3, 2012), 22 pages.
"Foreign Office Action", Chinese Application No. 201110362974.0, (dated Mar. 29, 2013), 11 pages.
"Generis iGoogle Gadget released—search across multiple repositories and repository types", Retrieved from: <http://www.generiscorp.com/blog/generis-igoogle-gadget-released-search-across-multiple-repositories-and-repository-types/> on Aug. 20, 2010, (Jun. 20, 2010), 2 pages.
"International Search Report and Written Opinion", International Application No. PCT/US2011/059514, (dated May 21, 2012), 8 pages.
"Launching Applications (ShellExecute, ShellExecuteEx, SHELLEXECUTEINFO)", Retrieved from: <http://msdn.microsoft.com/en-us/library/bb776886.aspx> on Aug. 20, 2010, (Jun. 30, 2010), 4 pages.
"Merging search suggestions. Merging search and address bar.". Retrieved from: <http://www.eggheadcafe.com/software/aspnet/33160047/merging-search-suggestions-merging-search-and-address-bar.aspx> on Aug. 23, 2010, (Sep. 24, 2008), 1 page.
"Non-Final Office Action", U.S. Appl. No. 12/947,170, (dated Oct. 25, 2012), 12 pages.
"Non-Final Office Action", U.S. Appl. No. 12/947,292, (dated Mar. 30, 2012), 19 pages.
"Non-Final Office Action", U.S. Appl. No. 13/801,637, (dated Jun. 18, 2013), 23 pages.
"Notice of Allowance", U.S. Appl. No. 12/947,170, (dated Apr. 4, 2013), 9 pages.
"Overview of the Main Window", retrieved from <http://help.copernic.com/topic/desktopsearch11en/di_overview.htm> on Aug. 31, 2011, 4 pages.
"PCT Search Report and Written Opinion", Application No. PCT/US2011/059516, (dated Mar. 26, 2012), 8 pages.
"PCT Search Report and Written Opinion", Application No. PCT/US2012/053683, (dated Dec. 28, 2012), 8 pages.
"Quick Look Previews in Spotlight Menu", retrieved from <http://mattgemmell.com/2011/07/24/quick-look-previews-in-spotlight-menu> on Aug. 31, 2011,(Jul. 24, 2011), 5 pages.
"Search suggestions", Retrieved from: <http://support.mozilla.com/en-US/kb/Search+suggestions> on Aug. 23, 2010, (Aug. 19, 2009), 4 pages.
"Using the Android Search Dialog", Retrieved from: <http://developer.android.com/guide/topics/search/search-dialog.html> on Aug. 20, 2010, (Aug. 5, 2010), 8 pages.
"Windows 7 Tools—Windows Search Tools", retrieved from <http://www.kodyaz.com/articles/window-7-tools-for-windows-search-options.aspx> on Aug. 31, 2011, 5 pages.

Aiglstorfer, Rodney "Launching your own Application via a Custom URL Scheme", Retrieved from: <http://iphonedevelopertips.com/cocoa/launching-your-own-application-via-a-custom-url-scheme.html> on Aug. 20, 2010, (Dec. 14, 2008), 17 pages.
Bharat, Krishna "SearchPad: Explicit Capture of Search Context to Support Web Search", Retrieved from: <http://www9.org/w9cdrom/173/173.html> on Aug. 20, 2010, (May 2000), 11 pages.
Chavez, Conrad "Mac OS X: Keyboard Shortcuts to Launch any Application", Blog: conradchavez.com retrieved from <http://blog.conradchavez.com/2007/06/28/mac-os-x-keyboard-shortcuts-for-any-application/> on Aug. 31, 2011, (Jun. 28, 2007), 9 pages.
Chirita, Paul-Alexandru et al., "Analyzing User Behavior to Rank Desktop Items", *L3S Research Center, University of Hanover*, Available at <http://www.l3s.de/~chirita/publications/chirita06analyzing.pdf>,(Oct. 13, 2006), 12 pages.
Fluit, Christiaan "AutoFocus: Semantic Search for the Desktop", *Proceedings of the Ninth International Conference on Information Visualisation*, (Jul. 2005), 8 pages.
Ha, Anthony "Zoho lets users search across its business applications", Retrieved from: <http://venturebeat.com/2010/06/01/zoho-search/> on Aug. 20, 2010, (Jun. 1, 2010), 7 pages.
Kuchinskas, Susan "Meta Search for the Desktop", Retrieved from: <http://www.internetnews.com/ent-new/article.php/3468611/Meta-Search-For-The-Deskstoop.htm> on Aug. 20, 2010, (Feb. 4, 2005), 4 pages.
Lu, Wen-Hsiang et al., "LiveTrans: Translation Suggestion for Cross-Language Web Search from Web Anchor Texts and Search Results", *In Proceedings of Research on Computational Linguistics Conference XV*, Available at <http://www.aclweb.org/anthology-new/O/O03/O03-1004.pdf>,(2003), 16 pages.
Manning, Vivian "So Long Launchy—Welcome Windows 7 Search", *Small City Law Firm Tech*, retrieved from <http://vmanning.posterous.com/so-long-launchy-welcome-windows-7-search> on Aug. 31, 2011,(Feb. 14, 2011), 2 pages.
Nguyen, Chuong "iPhone Nuance Dragon Search Searches Multiple Engines", Retrieved from: <http://pocketnow.com/software-1/iphone-nuance-dragon-search-searches-multiple-engines> on Aug. 20, 2010, (Dec. 18, 2009), 3 pages.
Paganelli, Laila et al., "Intelligent Analysis of User Interactions with Web Applications", *In Proceeding of the International Conference on Intelligent User Interfaces*, Available at <http://giove.isti.cnr.it/projects/cameleon/pdf/iui02.pdf>,(Jan. 16, 2002), 8 pages.
Slawski, Bill "Predictive Search Query Suggestions", Retrieved from: <http://www.seobythesea.com/?p=1375> on Aug. 23, 2010, (May 8, 2009), 14 pages.
Srivastava, Utkarsh et al., "Query Optimization over Web Services", *In Proceeding of VLDB 2006*, Available at <http://infolab.stanford.edu/~usriv/papaers/wsms.pdf>,(Sep. 15, 2006), 12 pages.
Tajima, Toshi "Your mobile and desktop search history now in sync", Retrieved from: <http://googlemobile.blogspot.com/2009/09/your-mobile-and-desktop-search-history.html> on Aug. 23, 2010, Sep. 30, 2009, 2 pages.
Vallet, David et al., "Personalized Content Retrieval in Context Using Ontological Knowledge", *IEEE Transactions on Circuits and Systems for Video Technology*, vol. 17, No. 3, Available at <http://ieeexplore.ieee.org/xpl/freeabs_all.jsp?arnumber=4118247>,(Mar. 2007),pp. 336-346.
"Final Office Action", U.S. Appl. No. 12/947,489, dated Jun. 19, 2014, 17 pages.
"Foreign Office Action", CN Application No. 201110363012.7, dated Apr. 18, 2014, 9 Pages.
"Foreign Office Action", CN Application No. 201110362974.0, dated Sep. 22, 2014, 7 Pages.
"Foreign Office Action", CN Application No. 201110362987.8, dated Jul. 28, 2014, 7 Pages.
"Foreign Office Action", CN Application No. 201110363012.7, dated Oct. 27, 2014, 9 Pages.
"Non-Final Office Action", U.S. Appl. No. 12/947,292, dated Aug. 29, 2014, 20 pages.
"Extended European Search Report", EP Application No. 11841597.5, dated May 26, 2015, 7 pages.
"Foreign Notice of Allowance", CN Application No. 201110362974.0, dated Mar. 2, 2015, 4 Pages.

(56) References Cited

OTHER PUBLICATIONS

"Foreign Office Action", CN Application No. 201110362987.8, dated Feb. 9, 2015, 8 Pages.
"Foreign Office Action", CN Application No. 201210328934.9, dated Feb. 3, 2015, 14 pages.
"Final Office Action", U.S. Appl. No. 13/229,496, dated Oct. 21, 2015, 15 pages.
"Foreign Notice of Allowance", JP Application No. 2013-539884, dated Oct. 7, 2015, 4 Pages.
"Foreign Notice of Allowance", TW Application No. 100135901, dated Dec. 22, 2015, 4 pages.
"Foreign Office Action", CN Application No. 201110362987.8, dated Aug. 7, 2015, 8 Pages.
"Foreign Office Action", CN Application No. 201210328934.9, dated Sep. 28, 2015, 12 Pages.
"Foreign Office Action", JP Application No. 2013-539885, dated Nov. 2, 2015, 7 pages.
"Foreign Office Action", TW Application No. 100135901, dated Sep. 25, 2015, 13 pages.
"Foreign Office Action", TW Application No. 100137155, dated Sep. 10, 2015, 11 pages.
"Foreign Office Action", AU Application No. 2012304710, dated Oct. 4, 2016, 6 pages.
"Foreign Office Action", CN Application No. 201210328934.9, dated Sep. 1, 2016, 11 pages.
"Non-Final Office Action", U.S. Appl. No. 13/229,496, dated Jul. 15, 2016, 15 pages.
"Accessibility features of Firefox", https://web.archive.org/web/20160506080507/http://kb.mozillazine.org/Accessibility_features_of_Firefox, Sep. 6, 2011, 5 pages.
"Extended European Search Report", EP Application No. 11841470.5, dated Nov. 22, 2016, 9 pages.
"Foreign Office Action", RU Application No. 2014108602, dated Aug. 3, 2016, 7 pages.
"Group Policy for Windows Search, Browse, and Organize", Retrieved at: http://technet.microsoft.com/en-us/library/dd744697—on Dec. 1, 2016, 7 pages.
"Spotlight", Retrieved at: http://web.archive.org/web/20050904034342/http://en.wikipedia.org/wiki/Spotlight_%28software%29, Aug. 25, 2016, 2 pages.
Walsh,"Add Your Website to Firefox's Search Bar Using OpenSearch", Retrieved at: https://davidwalsh.name/open-search, Dec. 3, 2008, 8 pages.
"Foreign Notice of Allowance", CN Application No. 201110362987.8, dated Feb. 29, 2016, 4 Pages.
"Foreign Notice of Allowance", RU Application No. 2013122474, dated Nov. 23, 2015, 13 pages.
"Foreign Office Action", AU Application No. 2011329315, dated Mar. 8, 2016, 3 pages.
"Foreign Office Action", CN Application No. 201210328934.9, dated Mar. 29, 2016, 11 Pages.
"Extended European Search Report", EP Application No. 12829328.9, dated Apr. 1, 2016, 10 pages.
"Final Office Action", U.S. Appl. No. 12/947,486, dated Apr. 19, 2016, 16 pages.
"Foreign Notice of Allowance", AU Application No. 2011329315, dated May 20, 2016, 2 pages.
"Foreign Office Action", JP Application No. 2014-529804, dated Mar. 22, 2016, 8 pages.
"Foreign Office Action", Application No. MX/a/2014/002786, dated Jun. 22, 2017, 5 pages.
"Foreign Office Action", EP Application No. 11841470.5, dated Aug. 29, 2017, 8 pages.
"Final Office Action", U.S. Appl. No. 13/229,496, dated Jan. 11, 2017, 23 pages.
"Foreign Notice of Allowance", JP Application No. 2014-529804, dated Apr. 4, 2017, 4 pages.
"Foreign Notice of Allowance", RU Application No. 2014108602, dated Mar. 1, 2017, 11 pages.
"Foreign Office Action", Application No. MX-a-2014-002786, dated Oct. 12, 2016, 5 pages.
"Foreign Office Action", AU Application No. 2012304710, dated Jan. 18, 2017, 5 pages.
"Foreign Office Action", AU Application No. 2012304710, dated Nov. 24, 2016, 5 pages.
"Foreign Office Action", EP Application No. 12829328.9, dated Mar. 3, 2017, 6 pages.
"Foreign Office Action", JP Application No. 2014-529804, dated Nov. 15, 2016, 8 pages.
"KDE UserBase Wiki Plasma/ KRunner", Retrieved at: https://userbase.kde.org/Plasma/Krunner, 3 pages.
"Non-Final Office Action", U.S. Appl. No. 12/947,486, dated Jan. 31, 2017, 17 pages.
"Non-Final Office Action", U.S. Appl. No. 13/229,496, dated Jun. 28, 2017, 21 pages.
Asyunin,"[iPad, iPhone]", Retrieved at: http://www.appbank.net/2011/07/18/iphone-application/277473.php, Jul. 18, 2011, 11 pages.
Boschi,"KRunner auto-launch feedback", Retrieved at: https://liveblue.wordpress.com/2011/04/11/krunner-auto-launch-feedback/, Apr. 11, 2011, 5 pages.
"Final Office Action", U.S. Appl. No. 13/229,496, dated Dec. 6, 2017, 33 pages.
"Foreign Office Action", EP Application No. 11841470.5, dated Mar. 6, 2018, 10 pages.
"Final Office Action", U.S. Appl. No. 12/947,486, dated Oct. 26, 2017, 16 pages.
"Foreign Office Action", CA Application No. 2,816,332, dated Sep. 26, 2017, 3 pages.
"Foreign Office Action", CN Application No. 201210328934.9, dated Aug. 31, 2017, 16 pages.
"Foreign Office Action", EP Application No. 12829328.9, dated Sep. 18, 2017, 7 pages.
"Foreign Office Action", KR Application No. 10-2013-7012590, dated Sep. 29, 2017, 9 pages.
"Office Action Issued in Korean Patent Application No. 10-2014-7006409", dated Sep. 5, 2018, 10 Pages.
"Notice of Allowance Issued in U.S. Appl. No. 13/229,496", dated Oct. 11, 2018, 12 Pages.
"Office Action Issued in Canadian Patent Application No. 2,816,332", dated May 23, 2018, 5 Pages.
"Office Action Issued in Canadian Patent Application No. 2,847,223", dated Jun. 15, 2018, 8 Pages.
"Office Action Issued in Mexican Patent Application No. MX/a/2014/002786", dated Feb. 1, 2018, 4 Pages.
"Non-Final Office Action", U.S. Appl. No. 12/947,486, dated Jan. 5, 2015, 18 pages.
"Notice of Allowance", U.S. Appl. No. 13/801,637, dated Jan. 22, 2015, 8 pages.
"Notice of Allowance Issued in Korean Patent Application No. 10-2014-7006409", dated Feb. 28, 2019, 4 Pages.
"Office Action Issued in Canadian Patent Application No. 2,847,223", dated Mar. 11, 2019, 6 Pages.

\* cited by examiner

EXTENSIBLE SEARCH TERM SUGGESTION ENGINE

RELATED APPLICATIONS

This application is a continuation of U.S. patent application Ser. No. 12/947,170, filed Nov. 16, 2010, entitled "Extensible Search Term Suggestion Engine", the entire disclosure of which is hereby incorporated by reference herein in its entirety.

BACKGROUND

As computers have become increasingly commonplace, the amount of electronic data that has become available to users has grown tremendously. While having access to such large amounts of electronic data can be very beneficial to users, it is not without its problems. One such problem is that it can be difficult sometimes for users to find the particular electronic data they are looking for. For example, users can encounter situations where they are not certain of the specific name or proper spelling of something they are looking for. Not being able to find what they are looking for due to this uncertainty can be a frustrating experience for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a search term suggestion engine of a computing device receives characters of user data as the characters are input. The user data is at least part of a search term to be provided to an application to search for the search term. An indication of multiple suggestion sources is received from the application, and one or more suggested search terms are obtained, from two or more of the multiple suggestion sources, based on the received characters. The one or more suggested search terms are combined into a combined set of suggested search terms, and the combined set of suggested search terms is returned to a search user interface for presentation to the user.

In accordance with one or more aspects, characters of user data are received as the characters are input. The user data is at least part of a search term to be provided to an application to search for the search term. One or more linguistic alternatives for the characters are determined, and both the characters and the one or more linguistic alternatives are provided to a suggestion source. One or more suggested search terms based on the one or more linguistic alternatives are received from the suggestion source, and the one or more suggested search terms are returned to a search user interface for display.

BRIEF DESCRIPTION OF THE DRAWINGS

The same numbers are used throughout the drawings to reference like features.

DETAILED DESCRIPTION

An extensible search term suggestion engine is discussed herein. The search term suggestion engine receives characters of user data that are entered as at least part of a search term to a search user interface (UI). As the characters of user data are received, the search term suggestion engine obtains suggested search terms from multiple different suggestion sources. Various different suggestion sources can be used, and the application being searched can specify which suggestion sources are to be used. The search term suggestion engine merges the suggested search terms obtained from the different sources into a combined set of suggested search terms, and provides this combined set of suggested search terms to the search UI for presentation to the user. Additionally, the search term suggestion engine can obtain various linguistic alternatives for the characters of user data that have been entered, such as alternatives including different symbols or characters (e.g., for East Asian languages), and alternatives including search terms in different alphabets (e.g., Latin alphabet, Cyrillic alphabet, etc.). The search term suggestion engine can then obtain suggested search terms from one or more of the multiple different suggestion sources based on the obtained linguistic alternatives.

Figure 1:
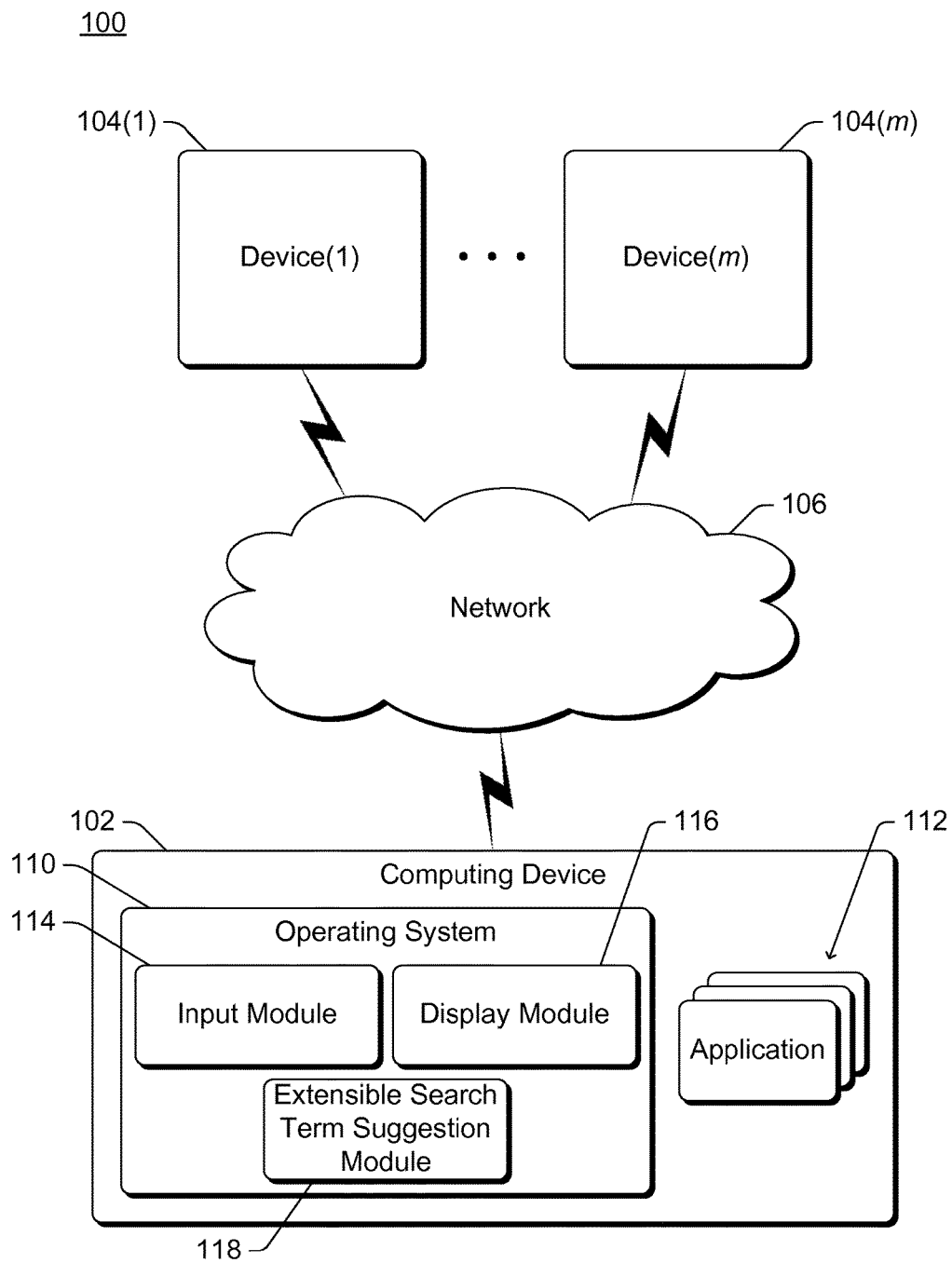
FIG. 1 illustrates an example system implementing the extensible search term suggestion engine in accordance with one or more embodiments.

FIG. 1 illustrates an example system 100 implementing the extensible search term suggestion engine in accordance with one or more embodiments. System 100 includes a computing device 102 that can optionally communicate with one or more (x) other devices 104(1), ..., 104(m) via a network 106. Network 106 can be a variety of different networks, including the Internet, a local area network (LAN), a public telephone or other phone network, an intranet, other public and/or proprietary networks, combinations thereof, and so forth. Computing device 102 can be a variety of different types of devices, such as a desktop computer, a notepad or tablet computer, a netbook or laptop computer, a server computer, a mobile station, an entertainment appliance, a set-top box communicatively coupled to a display device, a television, a cellular or other wireless phone, a game console, an automotive computer, and so forth. Additionally, although illustrated as a single device 102, it should be noted that the components or modules of computing device 102 can be implemented as a system of multiple devices, with the components or modules being distributed across the different devices in the system.

Devices 104 can be a variety of different computing devices capable of communicating with computing device 102. Computing device 102 can optionally access one or more of devices 104 to obtain various information, as discussed in more detail below. Similar to the discussion of computing device 102, devices 104 can be a variety of different types of devices. Devices 104 can be the same type or alternatively different types of devices as computing device 102. In system 100, computing device 102 is illustrated as communicating with devices 104 via network 106. Alternatively, computing device 102 can communicate with devices 104 via other types of communication mechanisms or connections, such as various wired and/or wireless connections (e.g., universal serial bus (USB) connections, wireless USB connections, Bluetooth connections, IEEE 1394 connections, and so forth).

Computing device 102 includes an operating system 110 and one or more applications 112. Operating system 110 manages the launching and running of applications 112 on computing device 102. Each of applications 112 can be a variety of different types of applications, such as productivity applications (e.g., email applications, word processing applications, spreadsheet applications, database applications, etc.), entertainment applications (e.g., game applications, audio and/or video playback applications, etc.), social networking applications, and so forth. An application 112 can access data locally, accessing data on computing device 102 (or on storage devices coupled to computing device 102) rather than accessing data on a device 104 via network 106. For example, an application 112 can be a word processing application that accesses data locally. In addition to, or alternatively in place of, accessing data locally, an application can access data on one or more devices 104 via network 106. For example, an application 112 can be an interface application for a device 104 that provides a movie service, allowing a user of computing device 102 to access movies from device 104 via that application 112.

Applications 112 allow users to search the various data that they access. A user can enter a search term (e.g., one or more characters, words, symbols, etc.) via a search UI that is specific to a particular application 112 or alternatively that is used by multiple applications 112. The application 112 being searched returns data that matches the search term for display or other presentation to the user.

Operating system 110 includes an input module 114, a display module 116, and an extensible search term suggestion module 118. Operating system 110 is typically implemented in software and/or firmware, although at least parts of operating system 110 can alternatively be implemented in hardware.

Input module 114 receives user inputs from a user of computing device 102. User inputs can be provided in a variety of different manners, such as by pressing one or more keys of a keypad or keyboard of device 102, pressing one or more keys of a controller (e.g., remote control device, mouse, trackpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, etc.) of device 102. User inputs can also be provided via other physical feedback input to device 102, such as tapping any portion of device 102, an action that can be recognized by a motion detection component of device 102 (such as shaking device 102, rotating device 102, etc.), and so forth. User inputs can also be provided in other manners, such as via audible inputs to a microphone, via motions of hands or other body parts observed by an image capture device, and so forth. These user inputs allow a user to interact with computing device 102, such as by inputting particular characters or symbols, selecting particular buttons or menu options, dragging and dropping various descriptions or images, and so forth.

Display module 116 generates, manages, and/or outputs a display for a screen of computing device 102. This display can include various information, such as information provided by applications 112, information provided by extensible search term suggestion module 118 or other modules of operating system 110, and so forth. The information displayed to the user can include user inputs received by input module 114. The screen on which display module 116 displays information can be implemented in a variety of different manners, such as using liquid crystal display (LCD) technology, plasma screen technology, image projection technology, and so forth. The screen can be included as part of computing device 102, or alternatively display module 116 can generate one or more signals that are output to one or more other display devices that include one or more screens. Although the discussions herein refer to displaying information on one or more screens, it is to be appreciated that information can alternatively be presented to users by display module 116 in other manners, such as audibly via one or more speakers.

Extensible search term suggestion module 118 provides one or more suggested search terms to assist a user of system 100. When a user desires to search an application, such as an application 112, the user inputs characters that make up at least a portion of a search term. Extensible search term suggestion module 118 receives these characters as they are input by the user, automatically identifies one or more suggested search terms based on the characters received, and returns the one or more suggested search terms for presentation (e.g., display) to the user. Extensible search term suggestion module 118 can obtain the suggested search terms from multiple different sources, which can be located on computing device 102 and/or on another device 104.

Additionally, extensible search term suggestion module 118 can leverage a linguistic alternatives generation module that generates one or more linguistic alternatives for the characters received. These linguistic alternatives are different symbols or characters that can correspond to the characters received, such as different East Asian language characters. These linguistic alternatives can also be translations of the characters into different alphabets (e.g., Latin alphabet, Cyrillic alphabet, etc.).

Search term suggestion module 118 is extensible in that different suggestion sources can be used for suggested search terms and linguistic alternatives for suggested search terms can be used. Different applications and/or users can select different suggestion sources to be used for suggested search terms as well as whether linguistic alternatives for suggested search terms are to be used.

Figure 2:
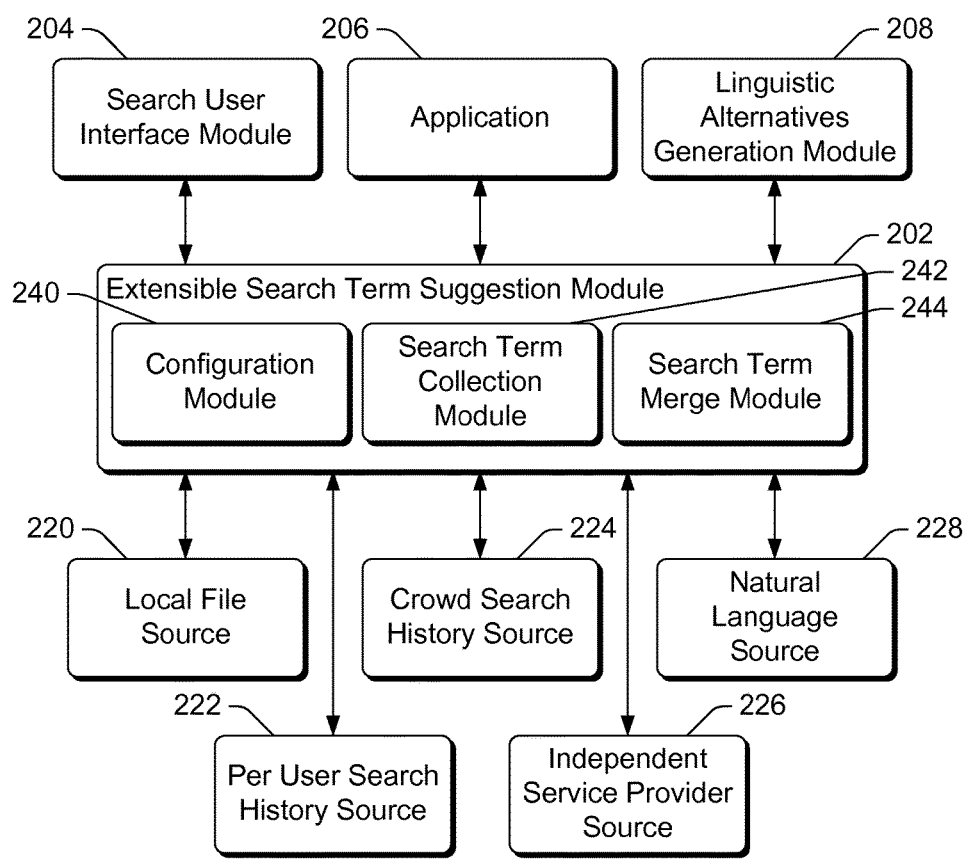
FIG. 2 is a block diagram illustrating an example system using the extensible search term suggestion engine in accordance with one or more embodiments.

FIG. 2 is a block diagram illustrating an example system 200 using the extensible search term suggestion engine in accordance with one or more embodiments. System 200 includes an extensible search term suggestion module or engine 202, a search UI module 204, an application 206, a linguistic alternatives generation module 208, and multiple suggestion sources 220, 222, 224, 226, and 228. Application 206 can also be a suggestion source, as discussed in more detail below. Extensible search term suggestion module 202 can be, for example, an extensible search term suggestion module 118 of FIG. 1. Application 206 can be, for example, an application 112 of FIG. 1, an application running on one of devices 104 of FIG. 1, and so forth.

In one or more embodiments, search UI module 204, application 206, and extensible search term suggestion module 202 are on the same computing device (e.g., computing device 102 of FIG. 1). Alternatively, one or more of search UI module 204, application 206, and extensible search term suggestion module 202 can be implemented on different computing devices. For example, extensible search term suggestion module 202 can be implemented on one computing device, search UI module 204 can be implemented on another computing device, and application 206 can be implemented on yet another computing device.

Search UI module 204 provides a search user interface to a user, receiving user inputs (e.g., via an input module 114 of FIG. 1), and also displaying or otherwise presenting (e.g., via a display module 116 of FIG. 1) suggested search terms as well as other information. User data representing a search term is input by the user, typically one character at a time. A character can be a letter, number, other symbol, and so forth. As the characters are input, search UI module 204 provides the characters of user data to extensible search term suggestion module 202. Extensible search term suggestion module 202 obtains suggested search terms from one or more of various different suggestion sources (e.g., suggestion sources 220-228, application 206). Extensible search term suggestion module 202 merges or combines the suggested search terms from the different suggestion sources to generate a combined set of suggested search terms, and returns the combined set of suggested search terms to search UI module 204. This process of obtaining suggested search terms and returning a combined set of suggested search terms is performed in response to each character input by the user, and can result in different combined sets of suggested search terms as characters are input.

In the discussions herein, extensible search term suggestion module 202 is discussed as returning a combined set of suggested search terms to search UI module 204 for presentation to a user, and these search terms are obtained from one or more of various different suggestion sources (e.g., suggestion sources 220-228, application 206). It should be noted, however, that suggestion sources typically are not (however alternatively could be) required to return suggested search terms. Accordingly, situations can arise where one or more suggestion sources return no suggested search terms. If none of the suggestion sources returns at least one suggested search term, then extensible search term suggestion module 202 returns no suggested search terms to UI module 204 for presentation to a user.

Figure 3:
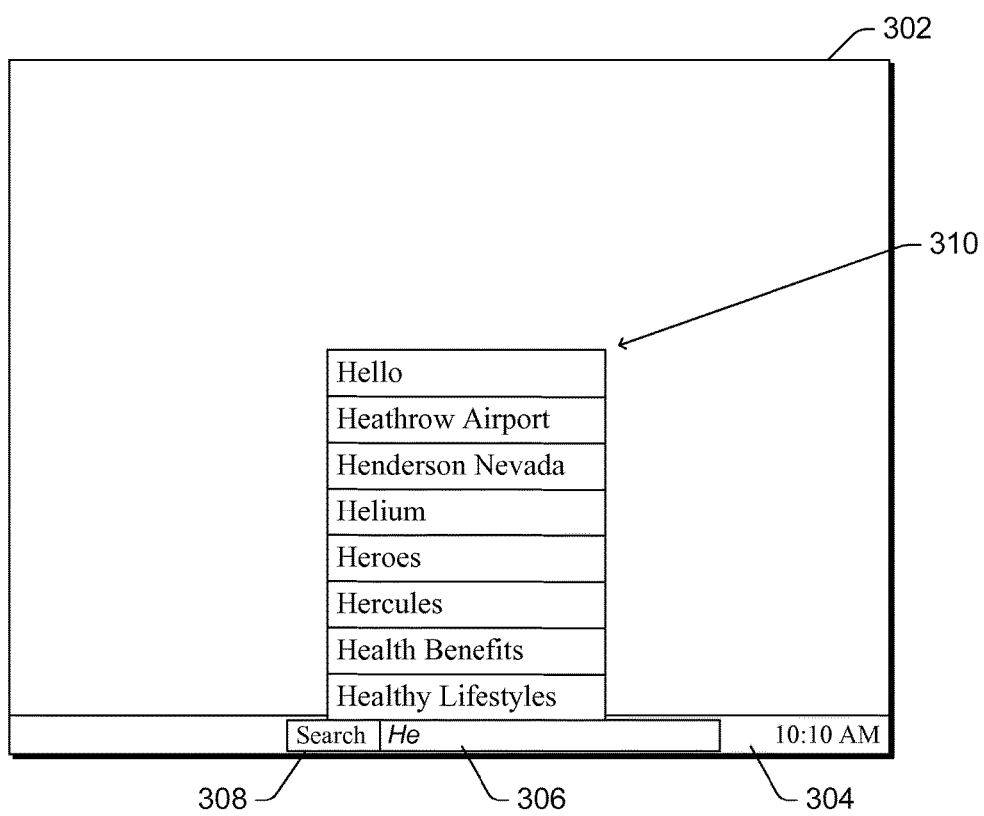
FIG. 3 illustrates an example screen display displaying suggested search terms in accordance with one or more embodiments.

FIG. 3 illustrates an example screen display 302 displaying suggested search terms in accordance with one or more embodiments. Screen display 202 includes a toolbar (or taskbar) 304. Toolbar 304 can include a variety of different information, such as the current time (illustrated as 10:10 AM). A data entry field 306 provides a location where a user can input characters of a search term and have those characters displayed. In the illustrated example, the user has entered the characters "He".

A search button 308 is also displayed. A user can select search button 308 in a variety of different manners (e.g., via input module 114 of FIG. 1), such as by touching search button 308 with a stylus or finger, maneuvering a pointer over search button 308 and pressing a button of a cursor control device (e.g., a mouse), pressing a particular key of a keyboard, and so forth. In response to user selection of search button 308, the characters currently entered in data entry field 306 are sent to an application for searching. The application to which the search term is sent can be determined in different manners, such as being the currently active application or another application selected by the user.

Screen display 302 also displays one or more suggested search terms as suggestion list 310. Suggestion list 310 includes the suggested search terms in the combined set of search terms (e.g., as generated by extensible search term suggestion module 202 of FIG. 2). In the illustrated example, the user has entered the characters "He", and the combined set of search terms are Hello, Heathrow Airport, Henderson Nevada, Helium, Heroes, Hercules, Health Benefits, and Healthy Lifestyles.

The user can then select one of the suggested search terms in suggestion list 310, and in response the selected suggested search term is entered in data entry field 306. For example, if "Helium" were selected from suggestion list 310, then "Helium" replaces "He" in data entry field 306. The user can select one of the suggested search terms in suggestion list 310 in a variety of different manners (e.g., via input module 114 of FIG. 1), such as touching the suggested search term with a stylus or finger, maneuvering a pointer over the suggested search term and pressing a button of a cursor control device (e.g., a mouse), and so forth.

It should be noted that the location of data entry field 306 and search button 308 are examples, and that the data entry field 306 and search button 308 can be displayed anywhere on screen display 302. For example, data entry field 306 and search button 308 can be displayed at the top of screen display 302, along the left side or right side of screen display 302, in the center of screen display 302, as part of a menu bar, as part of an icon bar or dock, within a window of an application to be searched (e.g., one of applications 112 of FIG. 1), and so forth. Additionally, suggestion list 310 is illustrated as being above and adjacent to data entry field 306. However, it is to be appreciated that the location of suggestion list 310 is an example, and suggestion list 310 can be displayed anywhere on screen display 302 (although typically so as not covering data entry field 306 or search button 308). For example, suggestion list 310 can be displayed at the top of screen display 302, along the left side or right side of screen display 302, in the center of screen display 302, in locations not adjacent to data entry field 306, at least partially within a window of an application to be searched, and so forth.

Returning to FIG. 2, in system 200 search UI module 204 and application 206 are illustrated as separate components. Search UI module 204 can be a system level search user interface module that provides a search user interface to various different applications. Alternatively, search UI module 204 can be an application-specific search module that provides a search user interface to a single application. In such situations, search UI module 204 can be included as a module of that single application (e.g., application 206).

Application 206 is the application that is to be searched for a search term. Multiple applications can optionally be searched for a search term, and in such situations application 206 is included as one of those multiple applications. The particular application that is to be searched for a search term can be identified in different manners. In one or more embodiments, in which the search UI module 204 is included as part of a particular application, then the particular application that includes the search UI module is the application that is to be searched for a search term. In other embodiments, the application that is to be searched for a search term can be identified in different manners, such as search UI module 204 providing an indication of the application that is to be searched for a search term, or the currently active application being the application that is to be searched for a search term. The currently active application refers to the application (e.g., one of applications 112 of FIG. 1 (an application other than the operating system)) that is currently running in the foreground and is the application that the user can interact with. Although multiple applications can be running concurrently on a computing device, only one is the currently active application at any given time. An identifier of the currently active application can be obtained from, for example, the operating system of the computing device.

Extensible search term suggestion module 202 includes a configuration module 240, a search term collection module 242, and a search term merge module 244. Configuration module 240 receives an indication from application 206 (or alternatively from another component or module, such as search UI module 204) specifying which suggestion sources extensible search term suggestion module 202 is to use for search term suggestions. Different applications can specify different suggestion sources, and the same application can specify different suggestion sources at different times. Accordingly, configuration module 240 receives the indication of which suggestion sources are to be used, and provides that indication to search term collection module 242. Configuration module 240 can also be configured with a default indication of which suggestion sources are to be used. The default indication of which suggestion sources are to be used is provided to search term collection module 242 if no indication of which suggestion sources are to be used is received from application 206. Configuration module 240 can also receive additional information from application 206 and/or search user interface module 204 to be used in obtaining suggested search terms as discussed in more detail below.

Search term collection module 242 obtains the suggested search terms from one or more of the suggestion sources. The one or more suggestion sources from which suggested search terms are obtained are those that are indicated as the suggestion sources to be used. Search term collection module 242 provides the characters of user data received from search UI module 204 to each suggestion source from which suggested search terms are to be obtained. In the example system 200, the one or more suggestion sources from which suggested search terms can be obtained include local file source 220, per user search history source 222, crowd search history source 224, independent service provider source 226, natural language source 228, and application 206. Each of these suggestion sources identifies, generates, or otherwise obtains suggested search terms based on the characters of user data received from search term collection module 242.

Local file source 220 is one or more components or modules that provide zero or more suggested search terms based on the files stored on local storage devices of a device (e.g., the device implementing extensible search term suggestion module 202 and/or search UI module 204). These local storage devices can be included in the device and/or be connected to the device (e.g., via a USB or other connection), and can include a variety of different types of storage devices (e.g., one or more magnetic disks, one or more optical disks, Flash memory devices, and so forth).

Local file source 220 analyzes one or more of various properties or metadata associated with files stored on the local storage device, and determines one or more suggested search terms based on that analysis. The various properties can be, for example, the name of the file, the name of a folder in which the file is stored, and so forth. Various metadata describing the files can be stored as part of or otherwise associated with the files and accessed by local file source 220, and this metadata can vary by file type. For example, a music file that stores a song can have as metadata a name of the recording artist of the song, a name of the song, names of individual band members that make up the recording artist, and so forth. By way of another example, a movie file can have as metadata a title of the movie, a name of a producer of the movie, names of actors and/or actresses in the movie, and so forth. By way of yet another example, a file that stores an electronic book file can have as metadata a title of the book, a publisher of the book, names of one or more main characters in the book, and so forth.

Local file source 220 can determine, as the zero or more suggested search terms, which properties and/or metadata (if any) match the received characters in a variety of different manners. A file can match the received characters if a particular property and/or particular metadata of the file begins with the received characters. A file can also match the received characters if one of multiple character sequences (e.g., words or any other sequence of characters separated by a space or punctuation symbol that may not be defined as a word in a particular language) of a particular property and/or particular metadata of the file begins with the received characters. For example, local file source 220 can identify all files having a file name that begins with or includes a word that beings with the received characters (the characters of user data as received from search term collection module 242), all files having metadata including a recording artist name that begins with or includes a word that beings with the received characters, all files having a movie title that beings with or includes a word that beings with the received characters, and so forth. The particular property or metadata to be checked to determine a match with the received characters can be identified in different manners, such as being received from application 206 (e.g., via configuration module 240), being received from a user of the device implementing extensible search term suggestion module 202, being pre-configured in local file source 220, being received from another component or module, and so forth In one or more embodiments, local file source 220 checks all files on each local storage device in determining the zero or more suggested search terms. Alternatively, local file source 220 can check only some of the files on the local storage devices, such as particular types of files (e.g., files having particular file extensions or categorized as a particular type of file), check only files in a particular folder or directory (e.g., only files in a movie file directory, only files in a music file directory, etc.), and so forth. Local file source 220 can be pre-configured with which files on the local storage devices to check, or alternatively can receive or otherwise obtain an indication of which files to check. An indication of which files to check can be received or otherwise obtained in different manners, such as from application 206 (e.g., via configuration module 240), from a user of the device implementing extensible search term suggestion module 202, and so forth.

Local file source 220 returns, to search term collection module 242, as suggested search terms the properties and/or metadata (if any) that match the received characters. Additionally, in one or more embodiments local file source 220 ranks the suggested search terms that local file source 220 returns. This ranking of the suggested search terms is an ordering of the search terms from a highest ranking to a lowest ranking. This ranking can be determined in different manners. In one or more embodiments, local file source 220 determines how many files have the same property or metadata that match the received characters, and ranks that property or metadata based on frequency of occurrence (e.g., an ordering from the most matches to the fewest matches). For example, if the received characters are "He", eight files have metadata that includes "Hercules", five files have metadata that includes "Helium", and two files have metadata that includes "Heroes", then the suggested search terms provided by local file source 220, in the order of their ranking (based on frequency of occurrence), are: Hercules, Helium, Heroes.

Per user search history source 222 is one or more components or modules that provide zero or more suggested search terms based on a history of search terms entered by the user of a device (e.g., the device implementing extensible search term suggestion module 202 and/or search UI module 204). When a search term is entered by the user (e.g., by selecting search button 308 of FIG. 1), search UI module 204 provides the search term to extensible search term suggestion module 202. Search UI module 204 can also provide the search term to application 206, or alternatively rely on extensible search term suggestion module 202 to provide the search term to application 206. Extensible search term suggestion module 202 provides the search term to per user search history source 222, which maintains a record of the search term, the current user of the device at the time the search term was entered, and the application that was searched for that search term.

Per user search history source 222 can obtain an indication of the user of the device at any particular time (e.g., when a search term was entered, when one or more characters are input, etc.) from an operating system of the device (e.g., an indication of the user that is signed into the device) or elsewhere (e.g., from extensible search term suggestion module 202). Similarly, per user search history source 222 can obtain an indication of an application (e.g., an application that is searched, a currently active application, etc.) from an operating system of the device or elsewhere (e.g., from extensible search term suggestion module 202).

To determine zero or more suggested search terms, per user search history source 222 obtains an indication of the current user of the device and an indication of the current application to be searched for the search term. Per user search history source 222 compares the received characters (the characters of user data as received from search term collection module 242) to the search terms that were previously entered by the current user for searching in the current application to be searched, and can identify matching previous search terms in a variety of different manners. A previous search term can match the received characters if at least the beginning characters of the previous search term are the received characters. A previous search term can also match the received characters if one of multiple character sequences (e.g., words or any other sequence of characters separated by a space or punctuation symbol that may not be defined as a word in a particular language) of the previous search term begins with the received characters. Per user search history source 222 returns, to search term collection module 242, as suggested search terms the previously entered search terms that match the received characters.

Alternatively, rather than being based on search terms for a single application, per user search history source 222 can operate across multiple applications. In such situations, to determine zero or more suggested search terms, per user search history source obtains an indication of the current user of the device, compares the received characters to the search terms that were previously entered by the current user, and identifies matching previous search terms. A record of the application that is searched for a particular search term need not be maintained, and the comparison of the received characters to the search terms need not be based on the current application to be searched.

Additionally, in one or more embodiments per user search history source 222 ranks the suggested search terms that source 222 provides. This ranking of the suggested search terms is an ordering of the search terms from a highest ranking to a lowest ranking. This ranking can be determined in different manners. In one or more embodiments, per user search history source 222 determines how recently each of the matching previous search terms was used and ranks the matching previous search terms in order from most recently used to least recently used. In the record of search terms maintained by per user search history source 222, per user search history source 222 can include an indication of when each search term was used (e.g., a timestamp of when the search term was entered), and this record can be accessed to determine how recently each of the matching previous search terms was used. In other embodiments, per user search history source 222 determines (e.g., based on the record of search terms maintained by per user history source 222) how frequently each of the matching previous search terms was used and ranks the matching previous search terms in order from most frequently used to least frequently used.

Furthermore, in one or more embodiments, application 206 can specify different scopes for which per user search history source 222 is to maintain records of the search terms. Application 206 specifies (e.g., via configuration module 240) the different scopes, and when a search term is entered also specifies the scope for the entered search term. To determine zero or more suggested search terms, per user search history source 222 obtains an indication of the current scope of application 206 (e.g., from application 206 via configuration module 240), and identifies matching previous search terms for only that scope.

Application 206 can define scopes in any manner it desires. For example, an entertainment application may define one scope as audio playback, and another as audio/video playback. If the current scope of application 206 is, for example, audio playback, then per user search history source 222 identifies matching previous search terms for audio playback but not audio/video playback. By way of another example, an electronic mail application may define one scope as email messages, another scope as contacts, and another scope as calendar entries. If the current scope of application 206 is, for example, contacts, then per user search history source 222 identifies matching previous search terms for contacts but not email messages or calendar entries. Per user search history source 222 need not be concerned with why there are different scopes for an application or what those different scopes are used for by the application. Rather, per user search history source 222 can just maintains the records of the search terms based on the scope for the search term.

Crowd search history source 224 is one or more components or modules that provide zero or more suggested search terms based on a history of search terms without regard for the user of the device. Crowd search history source 224 is similar to per user search history source 222, but operates without regard for the user of the device. Crowd search history source 224 maintains a record of the search term that was entered and the application that was searched for that search term. To determine zero or more suggested search terms, crowd search history source 224 obtains an indication of the application to be searched, compares the received characters to the search terms that that application was previously searched for, and identifies matching previous search terms. A record of the user of the device need not be maintained, and the comparison of the received characters to the search terms that were previously searched for need not be based on the current user of the device. Crowd search history source 224 returns, to search term collection module 242, as suggested search terms the previously entered search terms that match the received characters.

Alternatively, rather than being based on search terms for a single application, crowd search history source 224 can operate across multiple applications. In such situations, to determine zero or more suggested search terms, crowd search history source 224 compares the received characters to the search terms that were previously entered at the device and identifies matching previous search terms. A record of the application that is searched for a particular search term need not be maintained and a record of the user of the device need not be maintained. Similarly, the comparison of the received characters to the search terms that were previously searched for need not be based on the current application to be searched or on the current user of the device.

Additionally, in one or more embodiments crowd search history source 224 ranks the suggested search terms that crowd search history source 224 provides. This ranking of the suggested search terms is an ordering of the search terms from a highest ranking to a lowest ranking. This ranking can be determined in different manners, analogous to the discussion above regarding per user search history source 222.

Furthermore, in one or more embodiments application 206 can specify different scopes for which crowd search history source 224 is to maintain records of the search terms. To determine zero or more suggested search terms, crowd search history source 224 obtains an indication of the current scope of application 206, and identifies for only that scope matching search terms that were previously searched for, analogous to the discussion above regarding per user search history source 222.

Independent service provider source 226 is one or more components or modules that provide zero or more suggested search terms independently of the computing device implementing extensible search term suggestion module 202 and/or search UI module 204. Independent service provider source 206 can be a remote device or service, such as a service accessed over the Internet, that provides suggested search terms. Search term collection module 242 provides the characters of user data to independent service provider source 226, and receives zero or more suggested search terms from independent service provider source 226. The manner in which independent service provider source 226 determines zero or more suggested search terms based on those characters is determined by independent service provider source 226. Search term collection module 242 need have no (and typically has no) knowledge of how independent service provider source 226 determines the zero or more suggested search terms. Multiple such independent service provider sources 226 can be available to search term collection module 242, and module 242 can be pre-configured with an indication of which independent service provider source or sources 226 to use, or alternatively can receive or otherwise obtain an indication of which independent service provider source or sources 226 to use, such as from application 206 (e.g., via configuration module 240), from a user of the device implementing extensible search term suggestion module 202, and so forth.

Additionally, in one or more embodiments independent service provider source 226 ranks the suggested search terms that independent service provider source 226 provides. This ranking of the suggested search terms is an ordering of the search terms from a highest ranking to a lowest ranking. The manner in which independent service provider source 226 determines the ranking is determined by independent service provider source 226 itself—search term collection module 242 need have no (and typically has no) knowledge of how independent service provider source 226 determines the ranking.

Natural language source 228 is one or more components or modules that provide zero or more suggested search terms based on a dictionary of words. Natural language source 228 includes, or has access to, a particular dictionary of words (e.g., commonly used words in the English language or another language, commonly used words in a particular field that are in the English language or other languages, and so forth). Natural language source 228 compares the received characters (the characters of user data as received from search term collection module 242) to the languages in this dictionary, and returns as zero or more suggested search terms words that match (e.g., begin with) the received characters. Multiple such natural language sources 228 can be available to search term collection module 242, and module 242 can be pre-configured with an indication of which natural language source or sources 228 to use, or alternatively can receive or otherwise obtain an indication of which natural language source or sources 228 to use, such as from application 206 (e.g., via configuration module 240), from a user of the device implementing local file source 220, and so forth.

Additionally, in one or more embodiments natural language source 228 ranks the suggested search terms that natural language source 228 provides. This ranking of the suggested search terms is an ordering of the search terms from a highest ranking to a lowest ranking. This ranking can be determined in different manners. For example, natural language source 228 can maintain an indication of how commonly used each word in the dictionary is, and rank the suggested search terms in order from most commonly used to least commonly used. By way of another example, natural language source 228 can rank the suggested search terms based on the sizes of the words (e.g., in terms of numbers of characters or syllables in the word), ranking the suggested search terms in order from smallest word to longest word.

Additionally, application 206 itself can be a suggestion source. Similar to independent service provider source 226, search term collection module 242 provides the characters of user data to application 206 and receives zero or more suggested search terms from application 206. The manner in which application 206 determines zero or more suggested search terms based on those characters is determined by application 206 itself—search term collection module 242 need have no (and typically has no) knowledge of how application 206 determines the zero or more suggested search terms. Although application 206 can be a suggestion source, application 206 need not be a suggestion source. Rather, application 206 can rely on one or more of the other suggestion sources 220-228 and need not itself generate suggested search terms.

Furthermore, in one or more embodiments application 206 ranks the suggested search terms that application 206 provides. This ranking of the suggested search terms is an ordering of the search terms from a highest ranking to a lowest ranking. The manner in which application 206 determines the ranking is determined by application 206—search term collection module 242 need have no (and typically has no) knowledge of how application 206 determines the ranking.

Search term merge module 244 merges or combines the suggested search terms obtained by search term collection module 242 into a combined set of suggested search terms, and provides the combined set of suggested search terms to search UI module 204 for display to the user. The combined list is, for example, suggestion list 310 of FIG. 3. In one or more embodiments, search term merge module 244 generates the combined set of suggested search terms by arranging the obtained suggested search terms in a particular order that is based on the suggestion sources from which the suggested search terms are obtained. This ordering indicates which suggestion sources are to have their suggested search terms included earlier in the combined list (e.g., higher in suggestion list 310 of FIG. 3) than which other suggestion sources. Search term merge module 244 can be configured with the ordering to use, or alternatively can obtain the ordering elsewhere, such as from application 206, from another module or device, and so forth. Search term collection module 242 can identify which suggested search terms are obtained from which suggestion source, or alternatively the suggestion source can be identified in other manners (e.g., received from the suggestion source itself).

In one or more embodiments, in which the suggestion sources from which the suggested search terms are obtained are local file source 222, per user search history source 222, and application 206, the ordering of the suggested search terms is search terms obtained from per user search history source 222, followed by suggested search terms from local file source 220, followed by suggested search terms from application 206. For example, if the suggested search terms "Hello", "Heathrow Airport", and "Henderson Nevada" were obtained from local file source 220, the suggested search terms "Helium", "Heroes", and "Hercules" were obtained from per user search history source 222, and the suggested search terms "Health Benefits" and "Healthy Lifestyles" were obtained from application 206, then the ordering of the suggested search terms in the combined list would be: "Helium", "Heroes", "Hercules", "Hello", "Heathrow Airport", "Henderson Nevada", "Health Benefits" and "Healthy Lifestyles"

In one or more embodiments, search term merge module 244 also removes duplicate suggested search terms in generating the combined set of suggested search terms. If the same suggested search term is obtained from multiple suggestion sources, then that search term is included in the combined set only once. Which of the duplicates of the suggested search term are to be removed can be determined in different manners. In one or more embodiments, the first occurrence of the suggested search term in accordance with the ordering of the suggestion sources discussed above is kept, and other occurrences of the suggested search term are removed. E.g., continuing with the previous example, if the same suggested search term were to be included in suggested search terms from each of local file source 220, per user search history source 222, and application 206, then that suggested search term is kept as one of the suggested search terms obtained from per user search history source 222, and is removed from the suggested search terms obtained from local file source 220 and from application 206.

For the suggested search terms obtained from each suggestion source, the ordering in the combined set of the suggested search terms from that suggestion source is based on the ranking of those suggested search terms received from the suggestion source. In one or more embodiments, the suggestion source returns the suggested search terms in the order (based on the ranking mechanism the suggestion source uses) that the suggested search terms are to be included in the combined set. Alternatively, the ordering in the combined set of the suggested search terms from a particular suggestion source can be determined in different manners, such as alphabetically, randomly, according to other rules or criteria, and so forth.

It should be noted that the different suggestion sources of suggested search terms can have different latencies, which refers to how much time it takes for search term collection module 242 to receive suggested search terms from those different suggestion sources. The latency of a suggestion source can be the result of various factors, such as whether the suggested search terms are obtained from the same device as implements extensible search term suggestion module 202 or a remote device, whether other requests or operations are being performed by the suggestion source, the manner in which the suggestion source is implemented, and so forth.

Search term module 244 accounts for these potentially different latencies. In one or more embodiments, search term module 244 waits for a threshold amount of time. This threshold amount of time can vary, and can be, for example, on the order of 100 milliseconds to 1 second. Search term merge module 244 can be configured with the threshold amount of time to use, or alternatively can obtain the threshold amount of time elsewhere, such as from application 206, from another module or device, and so forth. Suggested search terms received within that threshold amount of time are provided to search UI module 204, and suggested search terms subsequently received from other suggestion sources are provided to search UI module 204 when they are received.

Additionally, in one or more embodiments, search term merge module 244 uses the ordering of suggested search terms based on the suggestion sources discussed above. If suggested search terms from a particular suggestion source are not received within the threshold amount of time, then suggested search terms received from suggestion sources earlier in the ordering are returned to search UI module 204, but suggested search terms received from suggestion sources later in the ordering are not returned until the suggested search terms from that particular suggestion source are received. For example, assume that suggested search terms are to be obtained from local file source 220, per user search history source 222, independent service provider source 226, and application 206, and that the ordering of the suggested search terms in the combined set is: search terms obtained from per user search history source 222, followed by suggested search terms from local file source 220, followed by suggested search terms from independent service provider source 226, followed by suggested search terms from application 206. If search terms are received from source 220, source 222, and application 206 within the threshold amount of time, but search terms from source 226 are not received within the threshold amount of time, then the search terms received from sources 220 and 222 are returned to search UI module 204 as the combined list. When the search terms from source 226 are subsequently received, then the search terms from source 226 and application 206 are returned to search UI module 204 as an addition to the combined list. The suggested search terms that are part of the addition to the combined list are appended to the end of the list of suggested search terms displayed by search UI module 204, rather than being inserted into the middle of the list.

Search term module 244 can include different numbers of suggested search terms from different suggestion sources. Search term merge module 244 can be configured with the number of suggested search terms to include from each suggestion source, or alternatively can obtain the number of suggested search terms to include from each suggestion source elsewhere, such as from application 206, from another module or device, and so forth. If a suggestion source returns fewer suggested search terms than search term module 244 is to include in the combined set for that suggestion source, then search term module 244 can include additional suggested search terms from other suggestion sources, or alternatively just include the suggested search terms that were returned. If including additional suggested search terms from other suggestion sources, search term module 244 adds suggested search terms from suggestion sources that are earlier in the ordering of suggested search terms based on the suggestion sources discussed above.

For example, assume that search term merge module 244 is to include eight suggested search terms in the combined set—three suggested search terms from local file source 220 and five suggested search terms from per user search history source 222, and that the ordering of the suggested search terms in the combined set is search terms obtained from per user search history source 222 followed by search terms obtained from local file source 220. Further assume that per user search history source 222 returns eight suggested search terms, and local file source 220 returns two suggested search terms. In this situation, search term merge module 244 generates a combined set of suggested search terms that includes six suggested search terms from per user search history source 222, followed by two suggested search terms from local file source 220.

Additionally, in one or more embodiments, the information maintained by per user search history source 222 (or alternatively other suggestion sources) can be roamed to different computing devices. This roaming allows the per user history maintained by source 222 to be used for the same user on different computing devices. The information maintained by source 222 can be roamed in different manners. For example, the information maintained by source 222 can be encrypted or otherwise stored in a secure manner that allows access to the information only when that user is logged into a computing device and/or otherwise provides an appropriate authentication (e.g., user name and password). The information can be stored on another device or service (e.g., a device 104 accessed via network 106 of FIG. 1), and retrieved when requested by the user (e.g., when the user logs into a computing device, when the user begins entering characters of a search term, and so forth). Alternatively, the information can be maintained on a portable device (e.g., on a flash memory device) that the user connects to different computing devices, the device that includes extensible search term suggestion module 202 can make the information available to other devices (e.g., via network 106 of FIG. 1), and so forth.

Furthermore, in one or more embodiments one or more of the suggestion sources modify the received characters (the characters of user data as received from search term collection module 242) in determining zero or more suggested search terms. This modification allows, for example, typographical errors to be identified. This modification can include, for example, swapping characters, adding one or more characters, and removing one or more characters. For example, if the received characters are "He", then the letter "H" or the letter "e" could be swapped with other characters (e.g., other letters), and a check made as to whether there are any suggested search terms for the source to provide based on the swapped characters. E.g., the letter "e" can be swapped with the letter "a", and a check made as to whether there are any suggested search terms for the source to provide based on received characters of "Ha" (e.g., any previously searched for search terms that begin with "Ha"). By way of another example, if the received characters are "He", then another letter can be added to the beginning, ending, or middle of the received characters. E.g., the letter "t" could be added resulting in "Het", "Hte", or "The", and a check made as to whether there are any suggested search terms for the source to provide based on received characters of "Het", "Hte", or "The". By way of yet another example, if the received characters are "He", then one of the letters can be removed. E.g., the letter "e" could be removed resulting in "H", or the letter "H" could be removed resulting in the letter "E", and a check made as to whether there are any suggested search terms for the source to provide based on received characters of "H" or "E".

In one or more embodiments, the suggestion source modifies the received characters in an attempt to identify zero or more suggested search terms only if no suggested search terms for the received characters are found. Thus, if the suggestion source identifies one or more suggested search terms using the received characters (without modification), then no modification of the received characters is performed. Additionally, in one or more embodiments the suggestion source uses a threshold for changes that indicates how many and/or how frequently characters can be modified. For example, only 1 out of every 3 characters can be modified, only 1 out of every 5 characters can be modified, and so forth.

It should also be noted that modifying the received characters can result in multiple suggested search terms based on the modified characters. In such situations, the multiple suggested search terms can be ranked based on their relevance to the received characters. This ranking based on relevance can be determined in different manners, such as based on the layout of a keyboard, the type of modification, and so forth. For example, the ranking can be swapped characters as most relevant, removed characters as next most relevant, and added characters as least relevant. By way of another example, if different swapped characters result in multiple suggested search terms, then the layout of the keyboard can be used to identify which letter is closest to the received character, and that letter is ranked as the most relevant. E.g., if the received characters are "He" and the "e" is swapped with "a" and "i", and one or more suggested search terms are identified based on received characters of "Ha" and "Hi", then suggested search terms based on received characters of "Ha" would be ranked higher than suggested search terms based on received characters of "Hi" because the letter "a" is closer than the letter "i" to the letter "e" on a QWERTY keyboard layout.

It should be further noted that although the suggested search terms are discussed herein as being text search terms, various other content and/or types of content can be returned by one or more of the suggestion sources. This other content and/or types of content can be displayed or otherwise presented by search UI module 204 in addition to, or alternatively in place of, the returned suggested search terms. For example, one or more images related to one or more suggested search terms can be returned and displayed, additional descriptive text related to one or more suggested search terms can be returned and displayed, audio content related to one or more suggested search terms can be returned and played back, and so forth.

Figure 4:
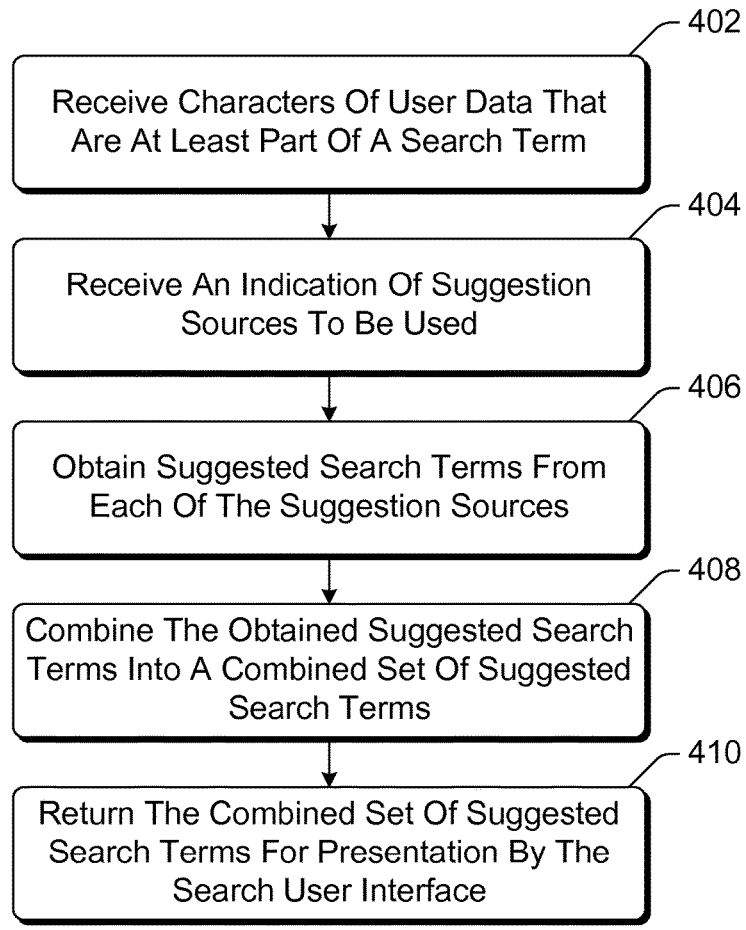
FIG. 4 is a flowchart illustrating an example process for generating a combined set of suggested search terms in accordance with one or more embodiments.

FIG. 4 is a flowchart illustrating an example process 400 for generating a combined set of suggested search terms in accordance with one or more embodiments. Process 400 can be implemented in software, firmware, hardware, or combinations thereof. Process 400 is carried out by an extensible search term suggestion module, such as module 118 of FIG. 1 or module 202 of FIG. 2. Process 400 is shown as a set of acts and is not limited to the order shown for performing the operations of the various acts. Process 400 is an example process for generating a combined set of suggested search terms; additional discussions of generating a combined set of suggested search terms are included herein with reference to different figures.

In process 400, characters of user data that are at least part of a search term are received (act 402). The characters can be input by a user in a variety of different manners as discussed above.

An indication of suggestion sources to be used is received (act 404). This indication can be received from an application to be searched for the search term or elsewhere as discussed above.

Zero or more suggested search terms are obtained from each of the suggestion sources (act 406). Different numbers of search terms can be received from the different suggestion sources at different times, as discussed above. Although one or more suggested search terms are typically obtained from each of the suggestion sources, it should be noted that in some situations a suggestion source may return no suggested search terms.

The obtained suggested search terms are combined into a combined set of suggested search terms (act 408). The obtained suggested search terms can be combined based on a particular ordering, and particular numbers of suggested search terms from each different suggestion source, as discussed above.

The combined set of suggested search terms is returned to a search user interface for presentation (act 410). This combined set of suggested search terms can be displayed or otherwise presented to the user by the search user interface as discussed above.

Returning to FIG. 2, system 200 also includes linguistic alternatives generation module 208, which supports obtaining and displaying suggested search terms with linguistic alternatives for certain languages. Some languages, such as East Asian languages (e.g., Japanese, Chinese, and Korean) are made up of numerous characters that do not correspond to individual keys of a keyboard. Other languages, such as Russian, can be represented using multiple different alphabets (e.g., Latin or Cyrillic in the case of Russian). Extensible search term suggestion module 202 supports obtaining suggested search terms with linguistic alternatives for such languages. Configuration module 240 receives an indication from application 206 (or alternatively from another component or module, such as search UI module 204) specifying whether linguistic alternatives generation module 208 is to be used (and thus whether extensible search term suggestion module 202 is to obtain suggested search terms with linguistic alternatives).

As extensible search term suggestion module 202 receives characters from search UI module 204, search term collection module 242 provides the received characters as they are received to linguistic alternatives generation module 208. Linguistic alternatives generation module 208 can identify linguistic alternatives for user inputs in a variety of different manners, and returns those linguistic alternatives to search term collection module 242. Linguistic alternatives generation module 208 typically identifies one or more linguistic alternatives for user inputs, and returns those one or more linguistic alternatives to search term collection module 242. It should be noted, however, that linguistic alternatives generation module 208 typically is not (however alternatively could be) required to return linguistic alternatives. Accordingly, situations can arise in which linguistic alternatives generation module 208 identifies and returns no linguistic alternatives for particular user input.

In one or more embodiments, linguistic alternatives generation module 208 identifies linguistic alternatives for a user input by translating the characters of the user input from one alphabet into another. For example, in the case of the Russian language, if the user input is Latin alphabet characters then linguistic alternatives generation module 208 translates the Latin alphabet characters into Cyrillic alphabet characters. Linguistic alternatives generation module 208 returns to search term collection module 242 the translation of the user input (in Cyrillic alphabet characters) as one or more linguistic alternatives.

Additionally, in one or more embodiments linguistic alternatives generation module 208 identifies one or more characters that can be represented by a phonetic syllable. In some situations, such as some East Asian languages, in order to enter a particular character a user inputs a phonetic syllable as multiple Latin alphabet characters. For example, the user may input a phonetic syllable using the Latin alphabet characters "bei", which can correspond to multiple different Chinese characters. Linguistic alternatives generation module 208 identifies zero or more different characters that can correspond to a particular user input, and returns those identified characters to search term collection module 242 as linguistic alternatives. For example, if the user input were "bei", then linguistic alternatives generation module 208 identifies the different Chinese characters that could be represented by "bei" and returns those Chinese characters to search term collection module 242 as linguistic alternatives. By way of another example, if the user input were "h", then linguistic alternatives generation module 208 identifies the different Chinese characters that could be represented by "h" (which would include multiple different phonetic syllables beginning with "h") and returns those Chinese characters to search term collection module 242 as linguistic alternatives.

Linguistic alternatives generation module 208 can be configured for particular languages or alternatively for multiple languages. For example, a configuration setting identifying the languages for which linguistic alternatives generation module 208 is to provide alternatives can be provided by a user of a device (e.g., the device implementing extensible search term suggestion module 202 and/or search UI module 204), by application 206, by search UI module 204, and so forth. By way of another example, different linguistic alternatives generation modules 208 can be included in system 200, each for a different language (e.g., one module 208 for Russian, another module 208 for Chinese, another module 208 for Japanese, etc.). Search term collection module 242 can provide the user input to one or more of these different modules 208 depending on the languages for which linguistic alternatives are desired (e.g., as indicated by a user of a device, by application 206, by search UI module 204, and so forth).

Search term collection module 242 receives the linguistic alternatives from linguistic alternatives generation modules 208 and provides both the characters received from search UI module 204 and the linguistic alternatives to the one or more of suggestion sources 220-228 and application 206 from which suggested search terms are to be obtained. Each suggestion source can then determine one or more suggested search terms based on the received characters, the linguistic alternatives, or both the received characters and the linguistic alternatives. If no linguistic alternatives are received from linguistic alternatives generation module 208, then search term collection module 242 provides just the characters received from search UI module 204 to the one or more of suggestion sources 220-228 and application 206 from which suggested search terms are to be obtained. Although obtaining suggested search terms from multiple suggestion sources is discussed above, it should be noted that the linguistic alternatives can be provided to a single suggestion source, and suggested search terms received from the single suggestion source and returned to search UI module 204.

Each suggestion source can determine the one or more suggested search terms in different manners, as discussed above. However, the determination can also be made based on the linguistic alternatives. For example, per user search history source 222 can include records of previous search terms that included Chinese characters. As the user inputs Latin alphabet letters as characters, different possible Chinese characters based on those characters are generated by linguistic alternatives generation module 208. Those different Chinese characters are provided to per user search history source 222 as if those Chinese characters were the actual characters input by the user. Source 222 can identify matches between the provided Chinese characters and the previous search terms that included Chinese characters, and return those matching Chinese characters as suggested search terms. Thus, the user can be presented with one or more suggested search terms that each include one or more Chinese characters in response to having entered a few Latin alphabet letters.

It should also be noted that, as the suggested search terms can be based on the linguistic alternatives, the suggested search terms can be in various different alphabets and/or languages. For example, the suggested search terms may include English language words that begin with "bei", as well as Chinese characters that are represented by "bei".

Figure 5:
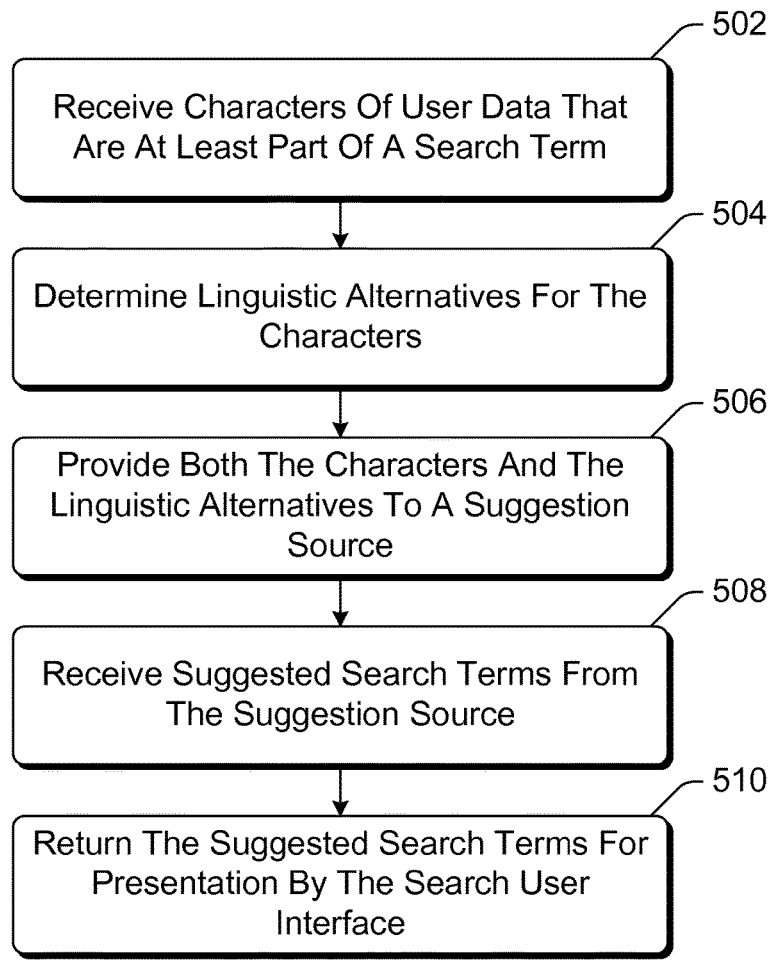
FIG. 5 is a flowchart illustrating an example process for generating suggested search terms based on linguistic alternatives in accordance with one or more embodiments.

FIG. 5 is a flowchart illustrating an example process 500 for generating suggested search terms based on linguistic alternatives in accordance with one or more embodiments. Process 500 can be implemented in software, firmware, hardware, or combinations thereof. Process 500 is carried out by an extensible search term suggestion module and linguistic alternatives generation module, such as module 118 of FIG. 1 or module 202 of FIG. 2, and module 208 of FIG. 2. Process 500 is shown as a set of acts and is not limited to the order shown for performing the operations of the various acts. Process 500 is an example process for generating suggested search terms based on linguistic alternatives; additional discussions of generating suggested search terms based on linguistic alternatives are included herein with reference to different figures.

In process 500, characters of user data that are at least part of a search term are received (act 502). The characters can be input by a user in a variety of different manners as discussed above.

Linguistic alternatives for the characters are determined (act 504). The linguistic alternatives can be determined in different manners, including translating the characters from one alphabet into another and identifying one or more characters that can be represented by a phonetic syllable as discussed above.

Both the characters and the linguistic alternatives are provided to a suggestion source (act 506). Alternatively, only the linguistic alternatives can be provided to a suggestion source in act 506. The linguistic alternatives can be provided to a single suggestion source, or alternatively to multiple suggestion sources as discussed above.

One or more suggested search terms are received from the suggestion source (act 508). One or more suggested search terms are typically received from each suggestion source to which the characters and linguistic alternatives were provided, although in some situations a suggestion source may return no suggested search terms.

The suggested search terms are returned to a search user interface for presentation (act 510). This suggested search terms can be displayed or otherwise presented to the user by the search user interface as discussed above. Additionally, the suggested search terms received from multiple suggestion sources can be combined into a combined set of suggested search terms as discussed above.

The extensible search term suggestion engine discussed herein supports a variety of different usage scenarios. The extensible search term suggestion engine provides applications flexibility in having suggested search terms generated for a user entering a search term to search an application. Different applications can rely on different suggestion sources, and need not (although can) themselves generate suggested search terms. The applications can specify which one or more suggestion sources are to be used to generate suggested search terms, and can also specify whether linguistic alternatives are to be used in generated suggested search terms.

Figure 6:
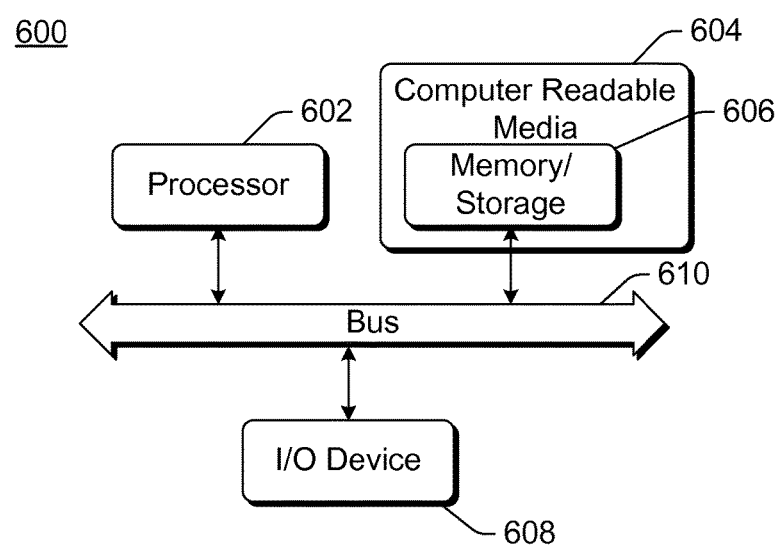
FIG. 6 illustrates an example computing device that can be configured to implement the extensible search term suggestion engine in accordance with one or more embodiments.

FIG. 6 illustrates an example computing device 600 that can be configured to implement the extensible search term suggestion engine in accordance with one or more embodiments. Computing device 600 can be, for example, computing device 102 or 104 of FIG. 1, and can implement at least part of system 200 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the extensible search term suggestion engine techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of obtaining search term suggestions from an extensible search term suggestion engine, the method comprising:

receiving characters of user data as the characters are input into a search user interface specific to a first application, wherein the user data is at least part of a search term to be provided to the first application to search for the search term, wherein the first application is one of multiple applications on a computing device and separate from the extensible search term suggestion engine;

receiving, from the first application prior to presentation of suggested search terms, an indication specifying a first suggestion source and a second suggestion source to use for generating the suggested search terms, both the first suggestion source and the second suggestion source identifying and generating at least one suggested search term based on the characters;

obtaining, from the first suggestion source and the second suggestion source specified in the indication, the suggested search terms;

combining the suggested search terms from the first suggestion source and the second suggestion source specified in the indication into a combined set of suggested search terms;

identifying, for the first suggestion source, a predetermined number of suggested search terms to be included in the combined set of suggested search terms;

determining that the first suggestion source returns fewer than the predetermined number of suggested search terms;

including in the combined set of suggested search terms, a number of suggested search terms equal to a difference between the predetermined number and a number of suggested search terms returned by the first suggestion source from another suggestion source; and returning the combined set of suggested search terms to the search user interface specific to the first application for presentation to a user.

2. A method as recited in claim 1, further comprising repeating the obtaining, combining, and returning as each of multiple additional characters of the user data input are received.

3. A method as recited in claim 1, wherein one of the first suggestion or the second suggestion source is a local file source that provides one or more suggested search terms based on files stored on a local storage device of the computing device.

4. A method as recited in claim 3, the local file source modifying the characters to identify one or more suggested search terms based on a threshold ratio that limits a number and a frequency of the received characters being modified, the modifying comprising swapping ones of the received characters, adding one or more characters to the received characters, or deleting one or more characters of the received characters, the local file source ranking the one or more suggested search terms based on relevance to the received characters and a layout of a keyboard of the computing device.

5. A method as recited in claim 1, wherein one of the first suggestion or the second suggestion source is a per user search history source that provides one or more suggested search terms based on a history of search terms entered by the user of the computing device.

6. A method as recited in claim 5, wherein the per user search history source provides one or more suggested search terms based on the history of search terms entered by the user of the computing device to different ones of the multiple applications, the history of search terms being maintained by the per user search history source and roamed to different computing devices to make the history of search terms available to the different computing devices.

7. A method as recited in claim 5, the per user search history source modifying the characters to identify one or more suggested search terms, the modifying comprising swapping ones of the received characters, adding one or more characters to the received characters, or deleting one or more characters of the received characters.

8. A method as recited in claim 1, wherein one of the first suggestion source or the second suggestion source is the first application.

9. A method as recited in claim 1, wherein the one or more suggested search terms obtained from the first suggestion source or the second suggestion source includes one of an image, additional descriptive text related to the one or more search terms, or audio content.

10. A method as recited in claim 1, wherein combining the one or more suggested search terms comprises:
removing duplicate suggested search terms from the suggested search terms obtained from the first suggestion source and from the second suggestion source; and
ordering the suggested search terms in the combined set of suggested search terms based on the suggestion sources from which the suggested search terms are obtained.

11. A method as recited in claim 10, further comprising receiving, from the first application, an additional indication of which of the first suggestion source or the second suggestion source are to have their suggested search terms be included earlier in the combined set of suggested search terms than which other of the multiple suggestion sources, the ordering comprising ordering the suggested search terms based on the additional indication.

12. A method as recited in claim 1, further comprising:
including in the combined set of suggested search terms, for the first suggestion source and the second suggestion source, the number of suggested search terms from the suggestion source if at least the number of suggested search terms is obtained from the suggestion source.

13. One or more computer storage media having stored thereon multiple instructions that, when executed by one or more processors of a computing device, cause the one or more processors to:
receive characters of user data as the characters are input, wherein the user data is at least part of a search term to be provided to an application to search for the search term;
determine one or more linguistic alternatives for the characters, wherein the one or more linguistic alternatives are determined based in part on an indication received from the application that specifies which of one or more languages to use for the one or more linguistic alternatives;
provide both the characters and the one or more linguistic alternatives to multiple suggestion sources prior to presentation of one or more suggested search terms, each of the multiple suggestion sources identifying and generating the one or more suggested search terms based on the characters;
receive, from the multiple suggestion sources, one or more suggested search terms based on the one or more linguistic alternatives and the characters; and
combine the one or more suggested search terms into a combined set of suggested search terms;
identify, for each of the multiple suggestion sources, a number of suggested search terms to be included in the combined set of suggested search terms;
include in the combined set of suggested search terms, for each of the multiple suggestion sources, one or more suggested search terms from another suggestion source if at least the number of suggested search terms is not obtained from the suggestion source; and
return the combined set of suggested search terms to a search user interface for display.

14. One or more computer storage media as recited in claim 13, wherein the characters of user data comprise Latin alphabet letters, and the one or more linguistic alternatives include one or more East Asian language characters.

15. One or more computer storage media as recited in claim 14, wherein to receive one or more suggested search terms is to receive one or more suggested search terms in Latin alphabet letters and receive one or more suggested search terms in East Asian language characters.

16. One or more computer storage media as recited in claim 13, wherein to determine one or more linguistic alternatives for the characters is to determine the one or more linguistic alternatives based in part on linguistic alternatives from previous search terms.

17. One or more computer storage media as recited in claim 13, wherein to determine one or more linguistic alternatives for the characters is to identify one or more East Asian language characters represented by the characters.

18. A device comprising:
one or more processors; and
one or more computer storage media having stored thereon multiple instructions that, responsive to execution by the one or more processors, cause the one or more processors to perform acts comprising:
receiving characters of user data as the characters are input, wherein the user data is at least part of a search term to be provided to an application to search for the search term, wherein the application is one of multiple applications on the device;
receiving, from the application prior to presentation of one or more suggested search terms based on the characters, an indication specifying which of multiple suggestion sources to use for the one or more suggested search terms, each of the multiple suggestion sources identifying and generating the one or more suggested search terms based on the characters;
obtaining, from each of the multiple suggestion sources specified in the indication, the one or more suggested search terms based on the received characters;
combining the one or more suggested search terms into a combined set of suggested search terms;
identifying, for each of the multiple suggestion sources, a number of suggested search terms to be included in the combined set of suggested search terms;
including in the combined set of suggested search terms, for each of the multiple suggestion sources, one or more suggested search terms from another suggestion source if at least the number of suggested search terms is not obtained from the suggestion source; and
returning the combined set of suggested search terms to a search user interface for presentation to a user.

19. A device as recited in claim 18, the acts further comprising:
including in the combined set of suggested search terms, for each of the multiple suggestion sources, the number of suggested search terms from the suggestion source if at least the number of suggested search terms is obtained from the suggestion source.

20. A device as recited in claim 18, the one or more suggested search terms including multiple suggested search terms, and the acts further comprising ordering the multiple suggested search terms by arranging the multiple suggested search terms in a particular order that is indicated by the application.

\* \* \* \* \*